United States Patent [19]
Wilson

[11] Patent Number: 6,068,465
[45] Date of Patent: May 30, 2000

[54] ROTARY TABLETTING PRESS

[75] Inventor: David Henry Wilson, Liverpool, United Kingdom

[73] Assignee: BWI PLC, Chesire, United Kingdom

[21] Appl. No.: 08/647,593

[22] Filed: May 13, 1996

[30] Foreign Application Priority Data

| May 18, 1995 | [GB] | United Kingdom | .................... 9510068 |
| Jun. 17, 1995 | [GB] | United Kingdom | .................... 9512377 |
| May 10, 1996 | [GB] | United Kingdom | .................... 9609380 |

[51] Int. Cl.$^7$ ..................................................... B30B 11/08
[52] U.S. Cl. ........................... 425/193; 425/345; 425/447
[58] Field of Search ................................... 425/147, 193, 425/218, 219, 345, 353, 447

[56] References Cited

U.S. PATENT DOCUMENTS

| 2,514,486 | 7/1950 | Green | ........................................ 425/345 |
| 3,565,016 | 2/1971 | Christie | ..................................... 425/345 |
| 3,566,806 | 3/1971 | Forster et al. | ............................ 425/345 |
| 3,918,873 | 11/1975 | Crossley et al. | .......................... 425/345 |
| 3,999,922 | 12/1976 | Shimada | .................................... 425/345 |
| 4,157,148 | 6/1979 | White | ......................................... 425/345 |
| 4,475,880 | 10/1984 | Crossley et al. | .......................... 425/345 |
| 4,793,791 | 12/1988 | Kokuryo | .................................... 425/345 |
| 4,943,227 | 7/1990 | Facchini | .................................... 425/345 |
| 5,088,915 | 2/1992 | Korsch et al. | ............................. 425/345 |
| 5,116,214 | 5/1992 | Korsch et al. | ............................. 425/345 |
| 5,186,956 | 2/1993 | Tanino et al. | ............................. 425/345 |
| 5,213,818 | 5/1993 | Facchini et al. | .................... 425/436 R |
| 5,462,427 | 10/1995 | Kramer | ..................................... 425/345 |

Primary Examiner—James P. Mackey
Attorney, Agent, or Firm—Foley & Lardner

[57] ABSTRACT

A rotary tabletting press for the production of tables comprises a rotatable turret carrying a die plate having a plurality of die cavities, each comprising a through bore having upper and lower openings, and respective pairs of upper and lower punches to work in each die cavity. Tabletting material enters the die cavities by an upper opening which is enclosed within a chamber disposed above the die plate. Dosing control of the die cavities comprises a fixed scraper blade disposed adjacent the upper surface of the die plate and intercepting the path of the die cavities. The turret comprises axially separable upper and lower parts and the chamber is defined between the upper and lower pans. A die clamping system includes a plurality of shouldered dies which accommodate a respective die cavity and which are simultaneously located in position. A common die clamping element is located axially when the upper housing part is in its operating position.

15 Claims, 7 Drawing Sheets

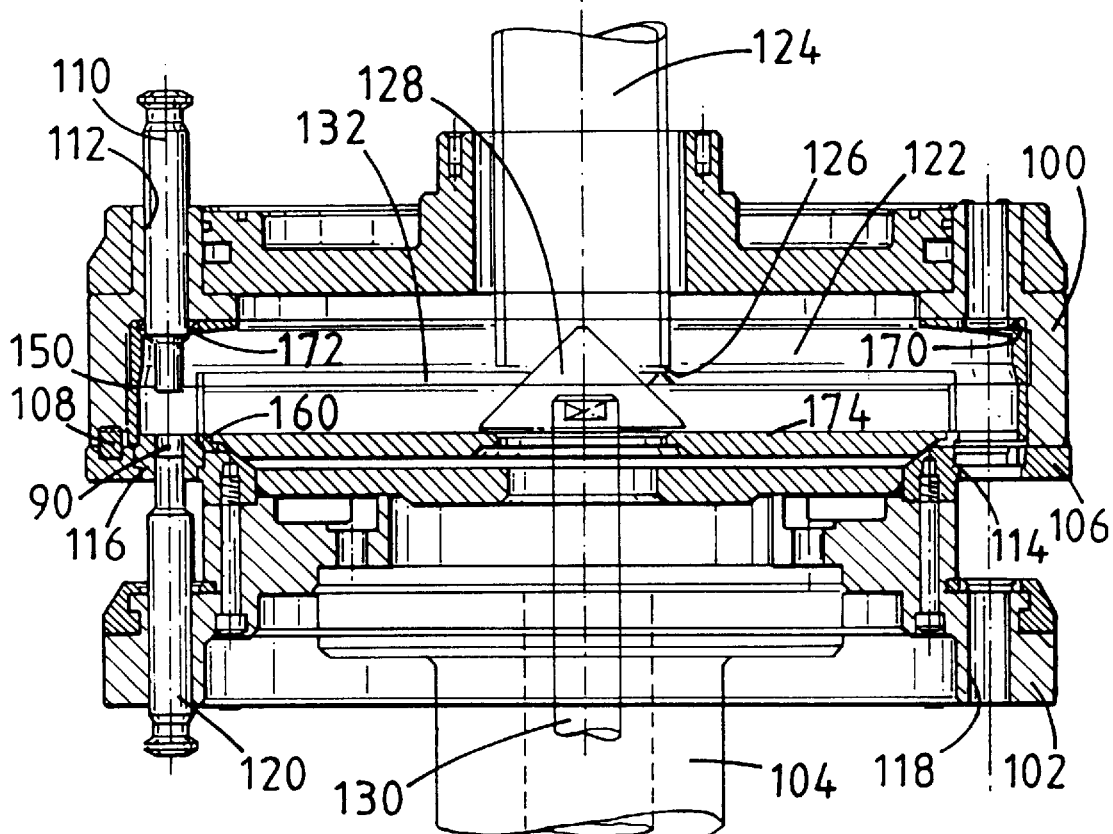
FIG. 5
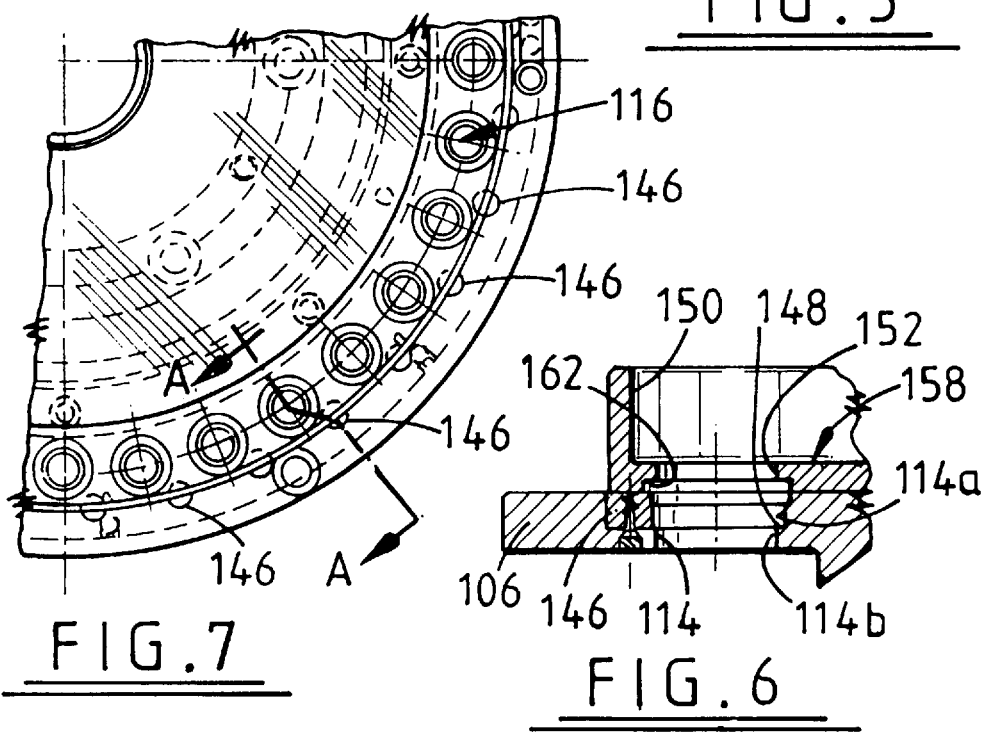
FIG. 7
FIG. 6

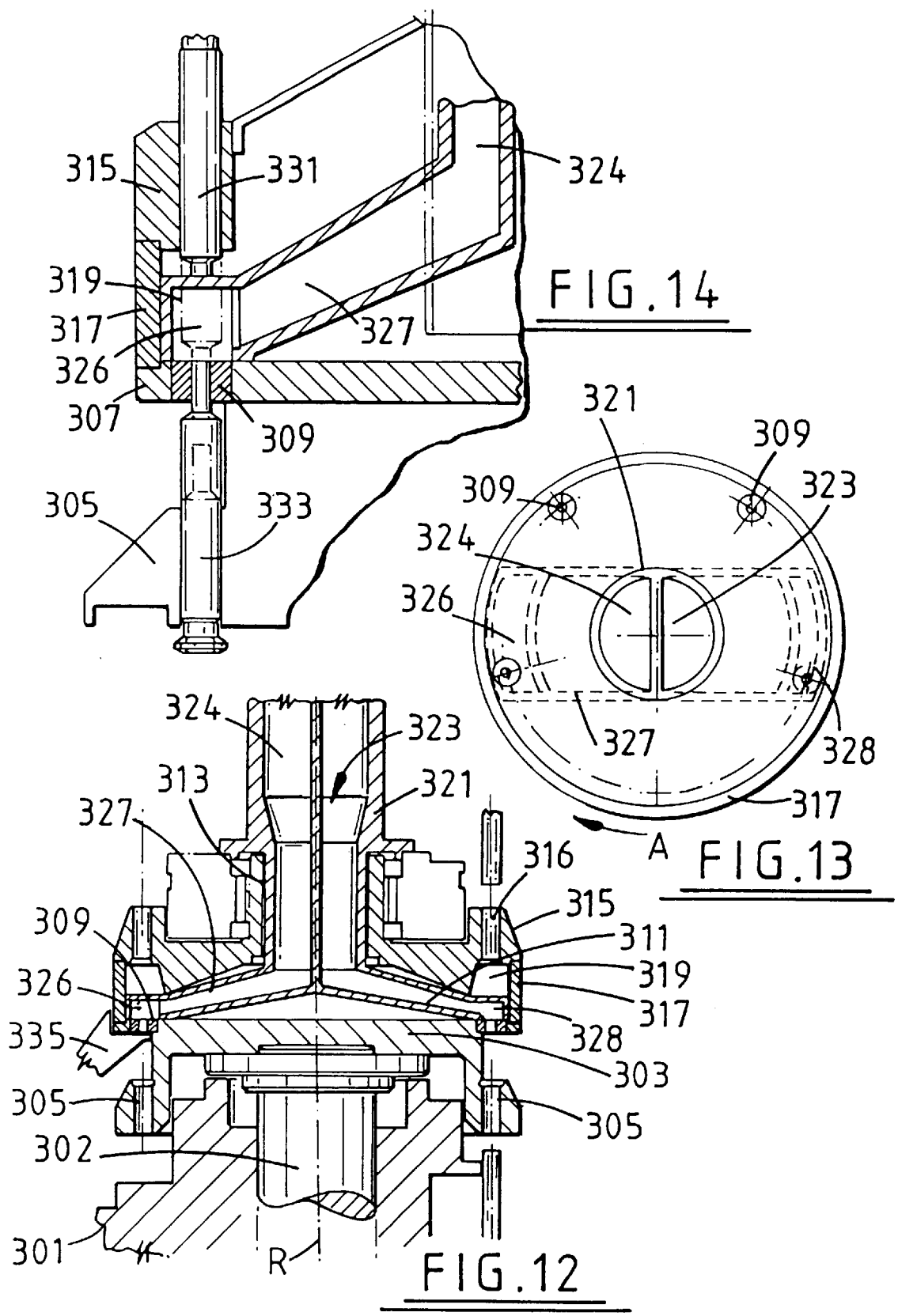

ROTARY TABLETTING PRESS

CROSS-REFERENCES TO RELATED APPLICATIONS, IF ANY

None.

STATEMENT AS TO RIGHTS TO INVENTIONS MADE UNDER FEDERALLY-SPONSORED RESEARCH AND DEVELOPMENT, IF ANY

None.

BACKGROUND OF THE INVENTION

1. Field of the Invention

The present invention relates to a rotary tabletting press for production of tablets from tabletting material.

2. Description of the Related Art

In a conventional tabletting machine, powdered or granulated material to be tabletted is fed onto the surface of a rotating die table within the confines of a feeder so as to fill dies in the die table as a die table rotates underneath the feeder. Thus, the surface of the die table rotates largely in an environment of fresh air, whilst product is introduced to that surface locally by means of the feeder. The quantity of material delivered to the die cavity is determined by the position of the lower punch in the die cavity and the effect of the trailing edge of the feeder scraping across the upper opening of the die cavity thereby leaving a metered dose within the die cavity. Opposed pairs of vertically reciprocal punches operate to enter the dies from opposite ends and are operated by stationary cams. Means is provided for adjusting the cams in order to adjust the amount of material which is compressed in each die to form each tablet and to control the thickness of the resulting tablet. In the conventional die press the finished tablet is ejected upwardly through the upper opening of the die cavity by upward movement of the lower punch. Naturally, the upper punch is elevated to permit this.

With the known system it is inevitable that some tabletting material will escape the boundaries of the feeder onto the rotating die plate and hence into the tabletting enclosure. This is disadvantageous since it results in loss of tabletting material and prolongs the clean-down operation at the end of the tabletting run.

It is an aim of the present invention to overcome the above problems whilst utilising a tabletting cycle which conforms largely to conventional and proven principles.

SUMMARY OF THE INVENTION

Accordingly, the present invention provides a rotary tabletting press for the production of tablets from tabletting material, comprising a turret driven to rotate about its own axis with respect to a stationary housing and carrying rotatably with it:

a die plate accommodating a plurality of die cavities set on a common pitch circle diameter coaxial with the axis of the turret, which die cavities each comprises a through bore having an upper opening and a lower opening;

a chamber enclosed within the rotatable turret and defined at least in part by an upper surface of the die plate, the chamber being disposed above the die plate wherein the respective upper openings of the die cavities open into said chamber and by which openings tabletting material is admitted to the die cavities; and a respective opposed pair of upper and lower punches to work in each die cavity, which punches are guided in respective punch housings carried with the turret above and below the respective die cavities and coaxial therewith, said chamber being interposed between the upper punch housings and the die plate and with the upper punches being axially movable through said chamber to enter the respective die cavity;

the press further comprising means to control axial movement of the respective opposed punches during a working cycle to form tablets in successive die cavities, tabletting material for filling the die cavities being supplied to the upper surface of the die plate by way of at least one feed tube and means to control the quantity of tabletting material in the die cavities, said means comprising a non-rotatable element disposed within said chamber adjacent said upper surface of the die plate and intersecting the path of the die cavities.

Advantageously, the means to control dosing of the die cavities comprises a blade intercepting the pitch circle diameter of the die cavities. More especially, the blade is disposed adjacent the upper surface of the die plate and acts to remove tabletting material from the die plate over a prescribed arc immediately before entry of the upper punch into the die cavity. The above-described chamber is enclosed within the turret, for example by a peripheral wall. Conveniently, the wall extends upwardly and radially inwardly to incorporate the upper punch guides and to form a dust-proof enclosure penetrated only by a product feed duct. Feeding of tabletting material to the chamber conveniently takes place down a centrally positioned filling tube which opens into the chamber. Supplementary chevrons, deflectors or rotating paddles can be arranged above the die table if required.

Multiple tablet formation within a revolution of the turret is possible, although in the described embodiment the free flowing of the tablet material onto the die plate means that the same material has to be used for all the tablets.

There are occasions where more than one tablet material is required to make a tablet, for example in the case of bi-coloured tablets, where a first pressing operation forms one part of the tablet in one colour and a second pressing operation forms the other part of the tablet in another colour. This is readily achieved with the conventional tablet press where the tabletting material is supplied by a local feeder to a prescribed area of the die plate. It would be advantageous to be able to produce tablets during one revolution where different materials are employed, whilst having the advantage of containing the spread of tabletting material into the general environment surrounding the turret.

Another aspect of the present invention aims to provide a solution.

Accordingly, another aspect of the present invention provides a rotary tabletting press for the production of tablets from tabletting material, comprising a turret driven to rotate about its own axis with respect to a stationary housing and carrying rotatably with it:

a die plate accommodating a plurality of die cavities set on a common pitch circle diameter coaxial with the axis of the turret, which die cavities each comprise a through bore having an upper opening and a lower opening;

a chamber disposed above the die plate and wherein the respective upper openings of the die cavities open into said chamber and by which openings tabletting material is admitted to the die cavities; and a respective opposed pair of upper and lower punches to work in each die cavity, which punches are guided in respective punch housings carried with the turret above and below the respective die cavities and coaxial therewith, said chamber being interposed between the upper punch housings and the die plate and with the upper punches being axially movable through said chamber to enter the respective die cavity; the press further comprising means to control axial movement of the respective opposed punches during a working cycle to form tablets in successive die cavities, and means to control the quantity of tabletting material admitted to the die cavities, and at least one stationary local tabletting material feeder disposed in said chamber and opening onto a discrete area of the upper surface of the die plate to feed tabletting material into successive die cavities as they pass under the feeder, and means feeding tabletting material to the at least one tablet material feeder.

The successive die cavities are filled with material as they pass under the local feeder. The position of the lower punch within the cavity determines the amount of material admitted to the die cavity. Preferably an overfilling takes place, in a conventional manner, with the lower punch being moved upwardly to discharge material into the feeder, before the trailing edge of the feeder acts as a scraper to leave the prescribed quantity of material in the die. The upper punch is then lowered into the die cavity to carry out the tabletting operation. The above-described chamber is enclosed within the turret, for example by a peripheral wall. Conveniently, the wall extends upwardly and radially inwardly to incorporate the upper punch guides and to form a dust-proof enclosure penetrated only by a product feed duct. Feeding of tabletting material to the at least one stationary tablet feeder conveniently takes place down a centrally positioned passage formed in the turret. Separate passageways are conveniently provided for each filler so that different materials (be they compositions or merely colours) can used. Thus, the charging of the die cavities follows standard practice, but with the advantage that the feeders are accommodated within an enclosed chamber of the turret. Preferably the tabletting material is fed to the local feeders from within the turret. The peripheral wall of the chamber is rotatable with the turret.

The number of feeders provided will depend on the number of tablet material pressing operations (for a given die) which are to be carried out in the course of one revolution of the turret.

In the first of the above-described arrangements tabletting material moves freely across substantially the entire surface of die plate to rotate with it, with only a small area of the die table cleared of product to leave the desired metered quantity in the successive die chambers passing the dosing blade. This is conveniently carried out by a stationary scraper blade depending from a stationary part of the housing which serves to deflect material from the pitch line over the short are required between positioning of the lower punch at the prescribed depth in the die and entry of the upper punch. The scraper serves to scavenge material from the top of the overfilled die and deflect the rotating bed of product radially inwards until the metered dose is safely sealed by the tip of the upper punch.

With an arrangement as afore-described in which the tabletting material floods onto the rotary die plate and the upper punches pass through the chamber accommodating the tabletting material, it is possible for the upper punches to be used in various ways to assist in filing of the die cavity, usually this will be in conjunction with the operation of the lower punches. Thus, the means to control the quantity of tabletting material admitted to the die cavities may be the controlled movement of the upper and lower punches. For example, simultaneous spaced apart movement of the opposed upper and lower punches in the presence of tabletting material can be used to draw a measured quantity of material into the die.

Tablet ejection is downwardly through the lower opening of the die cavity.

Also described is an advantageous die clamping mechanism for the rotary tablet press. It employs at least one die clamping element, by which several dies can be located simultaneously.

Preferably, location of the die clamping element is brought about on bringing together of axially separable upper and lower housing parts of the turret to their positions for use. Advantageously a tolerance compensation element is disposed between each die and at least one of the die clamping element and the die table to take up tolerances. A particulary convenient embodiment of the tolerance compensator is a resilient O-ring. The resilience is in the opposite direction to the main tablet ejection force. Advantageously the die clamping element conveniently comprises an annular ring having a plurality of bores corresponding in number to the number of dies. Advantageously at least one end of the die has a reduced diameter portion whereby all the dies can be located simultaneously and said reduced diameter end fits snugly into a respective said bore of the clamping element. Advantageously, each die has a shoulder which makes axial engagement with a shoulder of a corresponding bore in the die table. Contact is preferably direct in the direction of tablet ejection.

A preferred die comprises a cylindrical element having reduced diameter portions to opposite ends whereby the die can be inserted either way around. Advantageously, the outer periphery of the die is relieved to receive an anti-rotation member which cooperates with it and the die table.

It is advantageous that any angular location device for the die is concealed from the upper face of the die table and preferably also from the lower surface of the die table. This is advantageous as it avoids the need for additional gaps or cavities in these surfaces which could entrap tabletting material or cause other snagging hazards. The angular location device could form part of the clamping element.

Another aspect of the invention concerns controlling flow of tabletting material onto the die table and proposes a sensor monitoring the amount of material on the die table and controlling the opening of a feed gate in response to demand for tabletting material. In one embodiment the end of the feeding tube which opens onto the die table is movable in response to signals from the position sensor.

BRIEF DESCRIPTION OF THE DRAWINGS

The present invention will now be described further, by way of example only, with reference to the accompanying drawings, in which:

FIG. 5 is a vertical section showing part of an alternative embodiment of rotary tabletting press embodying the aspects of the present invention, FIG. 6 is a fragmentary split-section on AA of FIG. 7 illustrating in further detail retention means for the die, FIG. 7 is a plan view showing one quarter of the die table and die retaining ring, FIG. 12 is a schematic sectional view through a rotary tabletting press according to the present invention, FIG. 13 is a schematic plan view with the upper punch holders removed to show positioning of the stationary local feeders and feed tube, and FIG. 14 is a fragmentary sectional view through one punch cavity showing further details of the construction.

DESCRIPTION OF THE PREFERRED EMBODIMENTS

Figure 1:
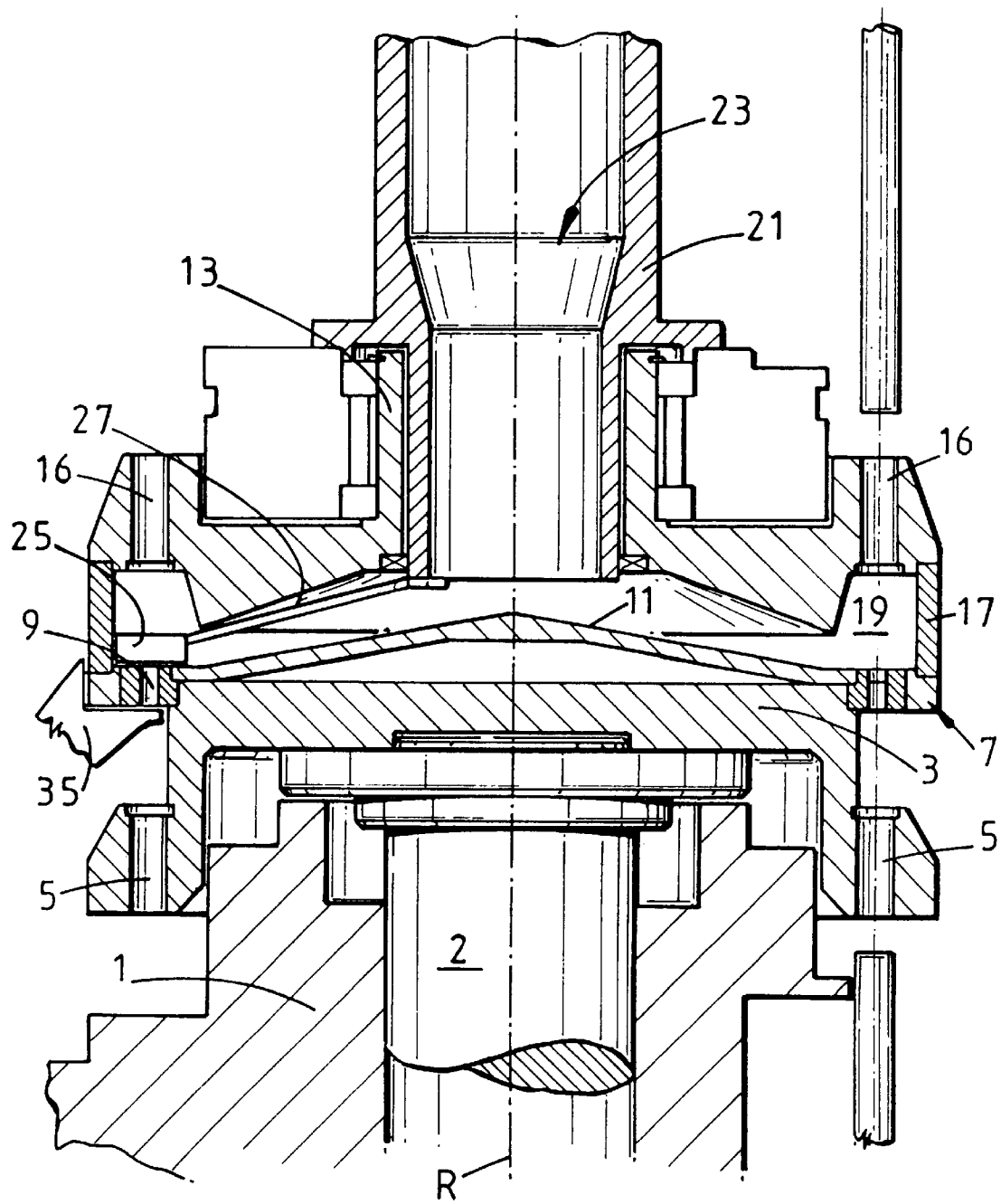
FIG. 1 is a schematic sectional view through a rotary tabletting press according to the present invention.

Referring to the drawings, a rotary tabletting press comprises a stationary housing 1 accommodating a drive shaft 2 journalled for rotation in the housing in a conventional manner (not shown) and having an axis of rotation R and having mounted thereon in driving connection therewith a lower part 3 of a rotatable turret. The lower part incorporates a plurality of circumferentially spaced bores 5 for respective lower punches of opposed pairs of upper and lower punches. The lower part includes an annular die plate 7 accommodating a plurality of circumferentially spaced die cavities 9 set on a common pitch circle diameter coaxial with the axis of a shaft 2 in a conventional manner. A conical deflection plate 11 extends from the axis of the turret radially outwardly and downwardly to the upper surface of the die plate 7. The turret further comprises an upper part 13 accommodating upper punch housings 15 with a plurality of circumferentially spaced bores 16 for the upper punches, and a peripheral wall element 17 which contacts the die plate 7. A tabletting material chamber 19 is defined radially inwardly of the wall 17 and between the upper and lower parts 3 and 13 of the turret.

Figure 2:
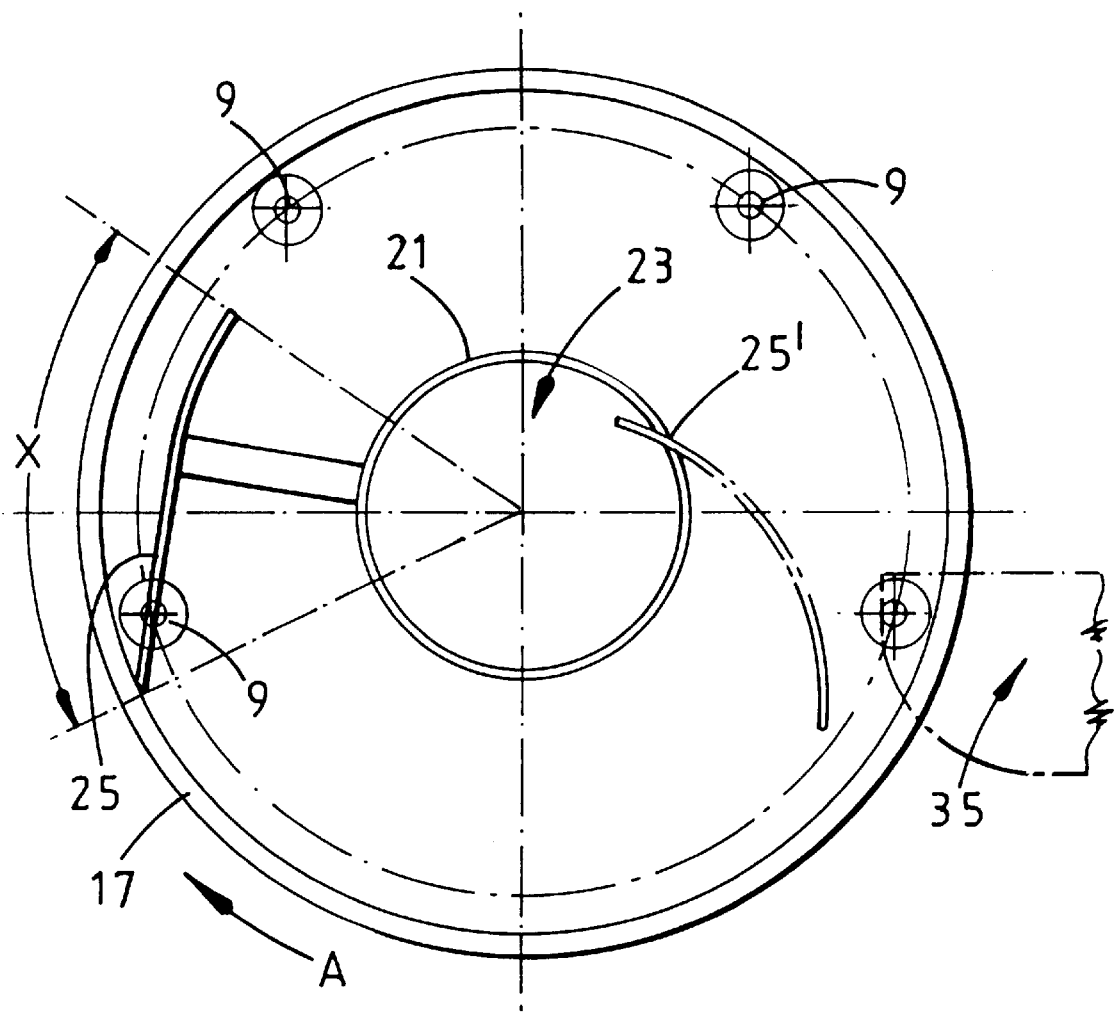
FIG. 2 is a schematic plan view with the upper punch holders removed to show positioning of the stationary scraper blade and feed tube.
Figure 3:
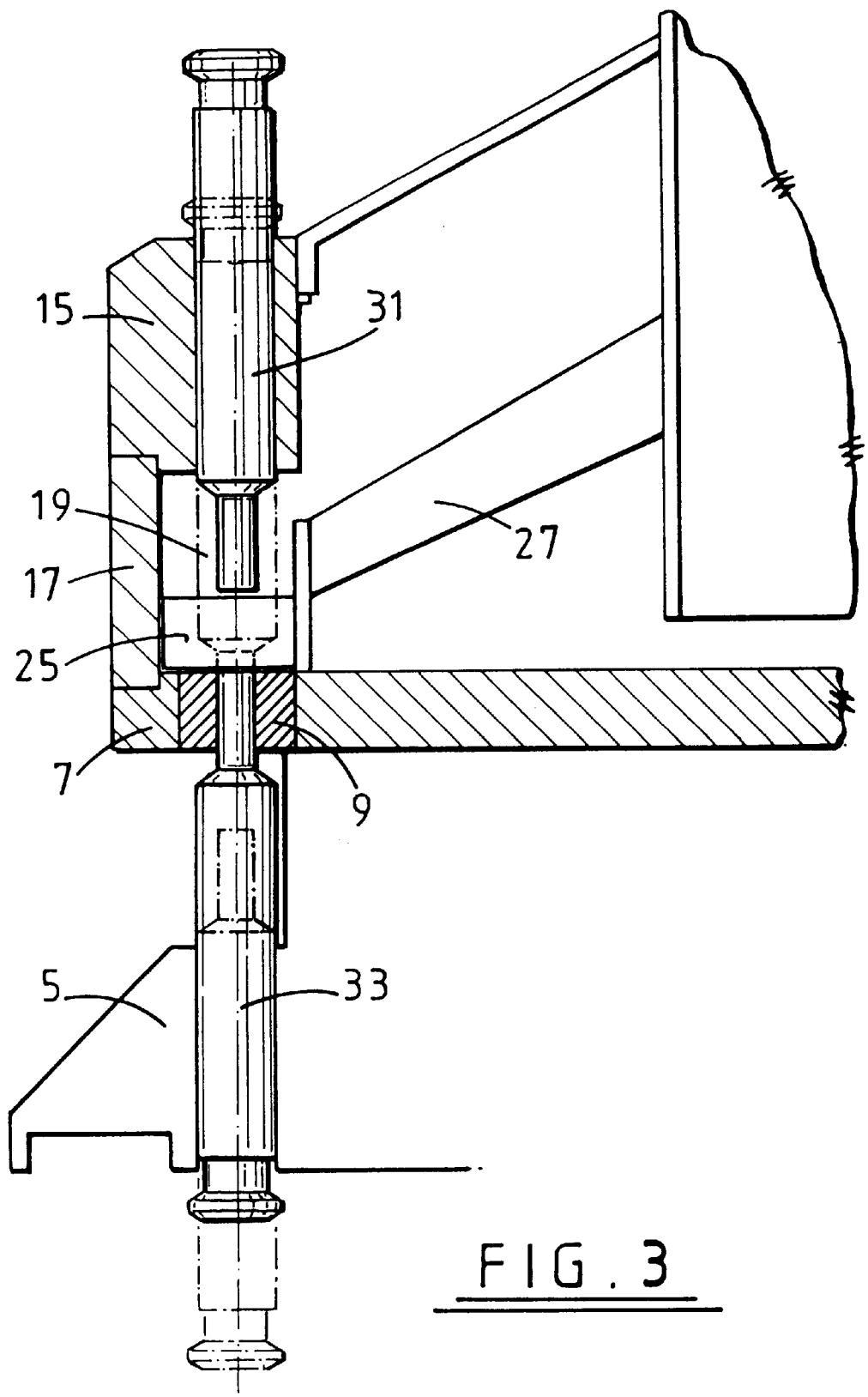
FIG. 3 is a fragmentary sectional view through one punch cavity showing further details of the construction.
Figure 4:
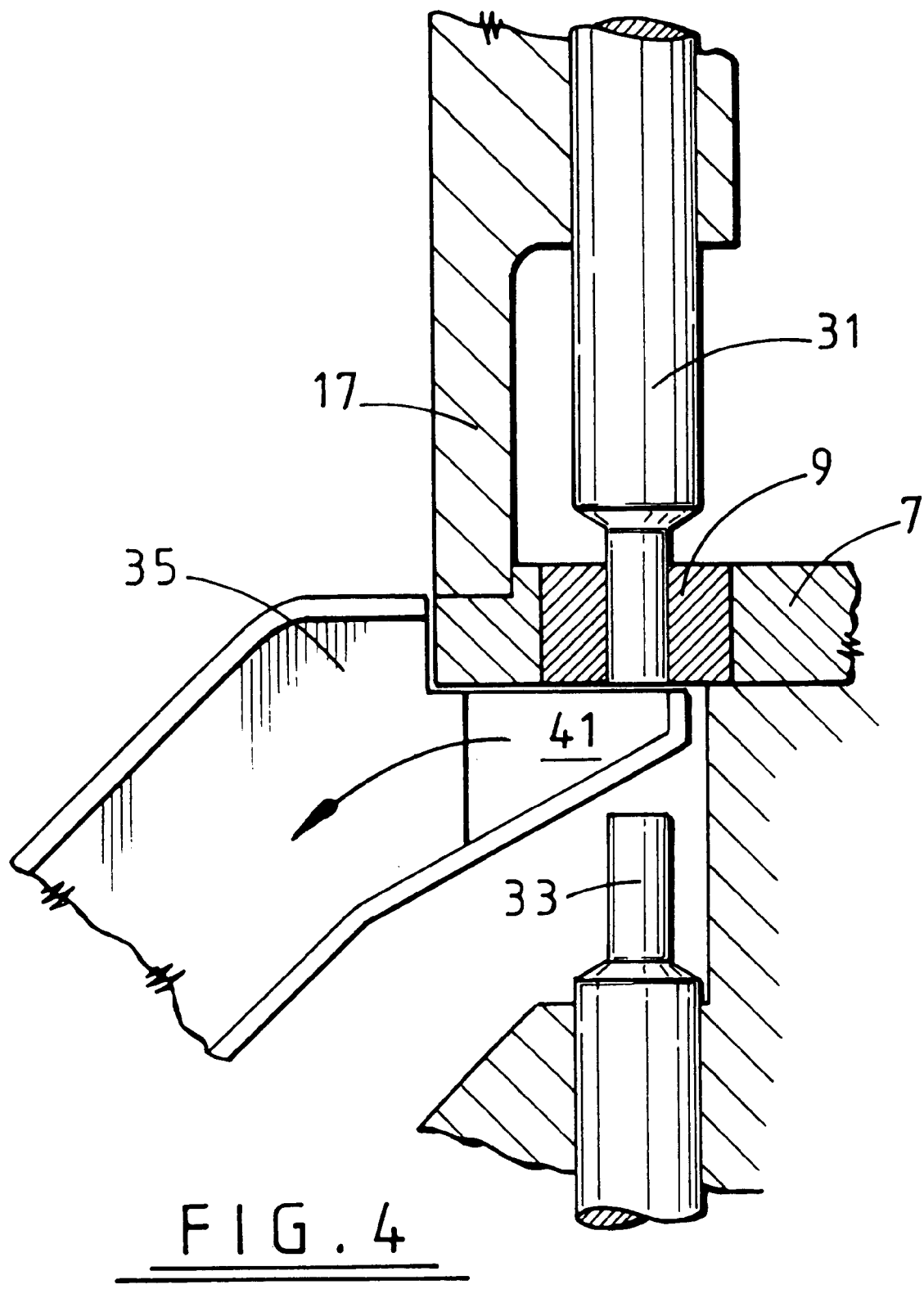
FIG. 4 is a fragmentary sectional view at the tablet take off position.

The upper turret part 13 is journalled for rotation on a stationary spindle 21 which incorporates a coaxial tablet material feed passage 23 feeding material to the chamber 19. A stationary scraper blade 25 extends from the stationary spindle 21 being connected thereto by a support arm 27. Respective pairs of upper and lower punches 31, 33 controlled by respective upper and lower cams (not illustrated) are slidably guided in the respective bores 16, 5 of the upper and lower punch housings to be entrant into the die cavity 9 according to the prescribed working cycle. The punches are shown in FIG. 3 by way of example. In a single-sided machine a pair of opposed compression rolls (not illustrated) act on the respective upper and lower punches at final compression, as is well known in the art. Referring now to FIG. 2 in which rotation of the turret is denoted by arrow A and in which only a few of the die cavities are illustrated, the scraper blade 25 extends radially inwardly from a position in close proximity with the circumferential wall 17 so as to clear tabletting material from the die plate over an area intercepted by the die cavities 9 and for a short arc χ of the revolution of the turret sufficient to allow entry of the upper punch into the die cavity. The compression cycle largely follows conventional practice, for example using stationary cams and compression rolls, with tablet ejection occurring approximately 180° from entry of the upper punch into the die cavity. However, ejection is by downward movement of the upper punch to eject the completed tablet from the lower opening of the die cavity into a take-off chute 35. A take off blade 41 is positioned to wipe the lower surface of the die plate 7 (see FIG. 4).

A supplemental stationary blade 25' may be provided to distribute tabletting material over the die plate, and specifically outwardly toward the pitch circle diameter of the die cavities. The angle of the surface 11 will be chosen to aid outward movement of the tabletting material from the infeed passage.

The invention may also be applied to a so-called double-sided machine in which there are two pairs of compression rolls, and appropriately profiled cam tracks, for example for producing two tablets per revolution of the turret or for producing double layer tablets. In each case an additional scraper blade is provided to meter the quantity of tabletting material to be admitted to the die cavity before entry of the upper punch for a second time. Additional material guides may be provided within the chamber to guide the tabletting material outwardly into the path of the dies. A second take-off blade and chute is provided as necessary. In the case of a double layer tablet, the discrete tablet feeders would be required.

In the illustrated embodiment the upper part is intended to be separable from the lower part, separation requiring upward axial movement of the upper part. Separation occurs where the upper turret part meets the die plate of the lower turret part. The elevating means and the clamping means is not described in further detail.

Figures 8, 9, 10:
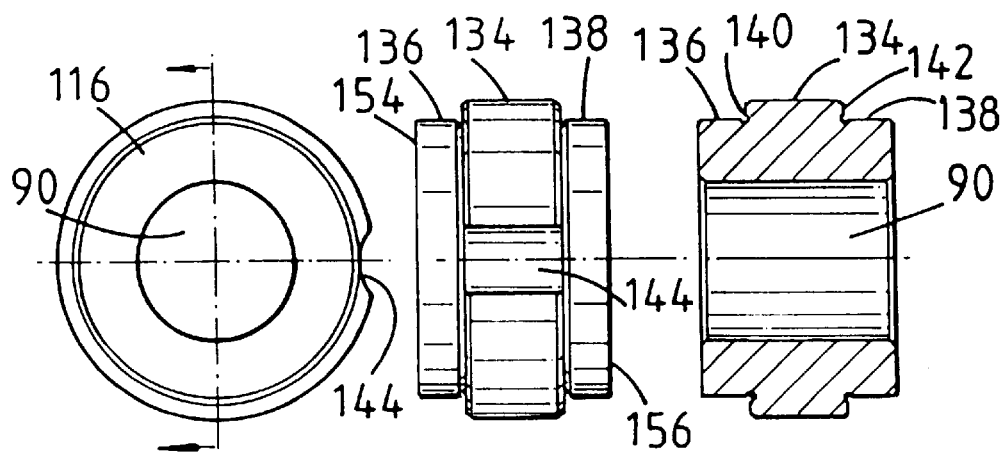
FIG. 8 is a plan view of a die.
FIG. 9 is a side view of the die of FIG. 8.
FIG. 10 is a diametrical section of the die of FIG. 8.

Referring now to FIGS. 5, 6 and 7 there is illustrated a vertical section showing part of a rotary tabletting press according to another embodiment and comprising a rotatable turret having upper and lower parts 100, 102. The lower part is driven rotatably from a main drive shaft 104 which is journalled in the housing of the tablet press, not further illustrated. In operation, the upper housing part is keyed to a die table 106 of the lower housing part by way of three locating pins, see for example 108. A jacking system (not illustrated) controls relative axial movement of the upper and lower housing parts. A clamping system holds the upper part to the lower part in use. Preferably the upper half is axially movable for separation and the lower half fixed. Conveniently, the upper half is mounted in a way which allows limited angular pivoting of the turret about a horizontal axis once it has been elevated. One upper punch is shown at 110 guided for reciprocal movement in a bore 112 of the upper housing part. The die table 106 has a plurality of stepped through bores 114 to accommodate a respective die 116 shown further in FIGS. 8, 9 and 10. The lower housing part 102 has a plurality of bores 118 each accommodating a respective lower punch 120. It will be understood that there is respective upper and lower punch 110, 120 for each die 116 and these are set on a common pitch circle diameter relative to the axis of rotation of the turret. Movement of the upper and lower punches is controlled by respective upper and lower stationary cams and by compression rolls (not illustrated) as is common in the art.

FIG. 5 shows the upper and lower housing parts in their closed position ready for use. A material feed chamber 122 is formed within the turret partly by components of the lower housing part and partly by components of the upper housing part. Tabletting material is brought into the chamber down a feed tube 124 having an open end 126 which can be moved relative to a feed cone 128. A feeder mechanism for controlling distribution of tabletting material across the die table to the dies is carried from a stationary shaft 130 conveniently passing through the main drive shaft and attached to the machine structure, for example at the main gear box. Part of the feeder mechanism is shown schematically at 132. One embodiment is described further with reference to FIG. 11.

Each die 116 comprises a central outer diameter portion 134 and two reduced diameter end portions 136, 138 defining axially orientated shoulders 140, 142. Each die has a uninterrupted through bore forming the respective die cavities 90 of the die table. The outer periphery of central enlarged portion 134 has an arcuate cut-out 144 to receive a cylindrical key 146 for locating a die against rotation. The bore 114 in the die table has larger and smaller diameter portions 114a, 114b defining an axial shoulder 148 against which one of shoulders 140, 142 of the die engages according to the orientation of the die. Location of each die within the bore 114 of the die table is achieved using an annular die clamping ring 150 which has a plurality of bores 152 dimensioned to receive either one of the reduced diameter portions 136, 138 of the die 116 so that either end face 154, 156 of the die finishes flush with the upper surface 158 of the die clamping ring. An O-ring 160 fits between the upper facing axial shoulder of the die and the underside axial surface 162 of the die clamping ring. The die clamping ring can be secured to the die table by a plurality of bolts but more conveniently it is located by the axial positioning of the upper turret housing part onto the lower turret housing part which brings a cooperating part 170 into engagement with the outer rim 150 of the die clamping element. Component 170 conveniently comprises a seal retaining ring which makes cooperating engagement with the upper housing part 100 and also serves to retain respective upper punch seals 172. In the illustrated embodiment the peripheral wall of the material containment chamber is formed by the respective rim parts of the die clamping ring and the seal retaining ring 170. A centre cover plate 174 fits within the annular die clamping ring 150 and lies flush with the upper surface 158 thereof. The die clamping arrangement illustrated in FIGS. 5, 6 and 7 is employed where there is downward tablet ejection. In a case where there is upward tablet ejection, the clamping element would be positioned on the underside of the die table.

Figure 11:
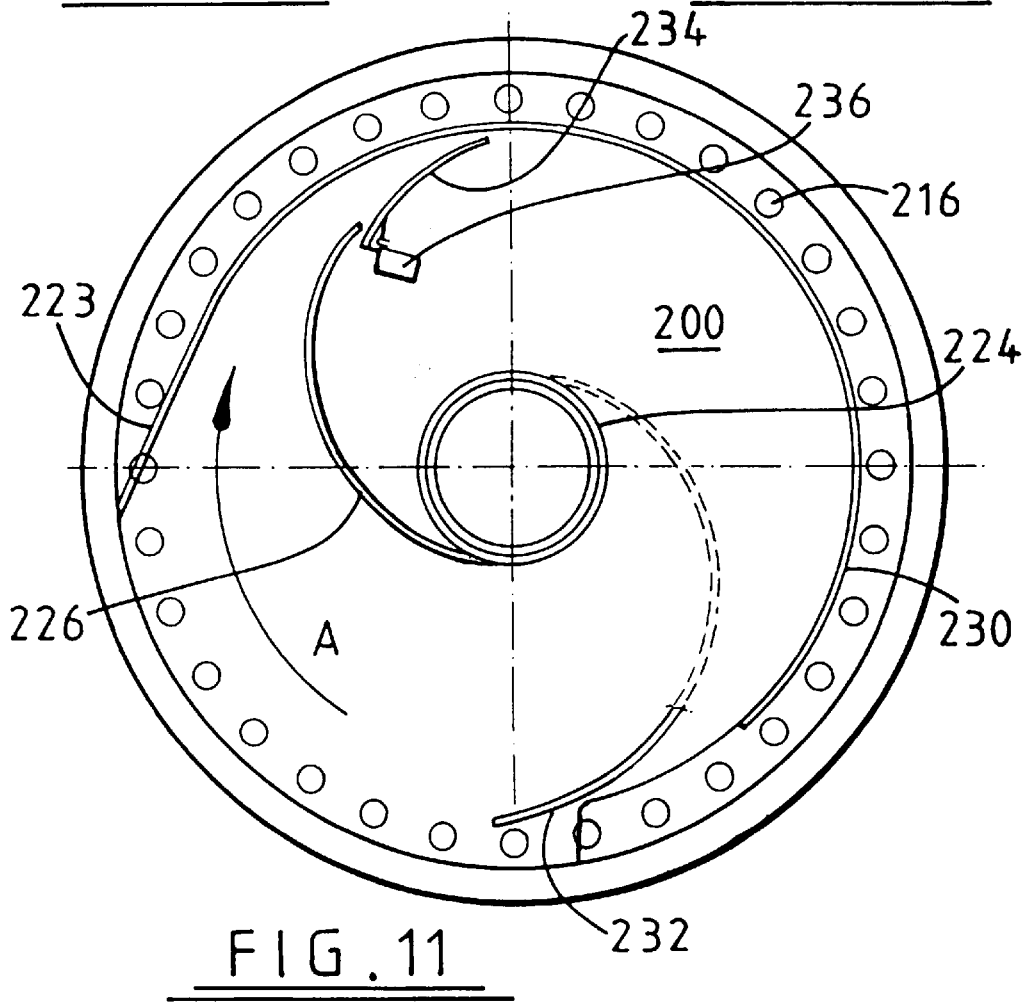
FIG. 11 is a schematic plan view looking down onto the die table and showing an alternative embodiment for controlling flow of the tabletting material.

Referring now to FIG. 11, the top of the die table is shown schematically at 200 and has a plurality of bores each receiving a respective die 216. The direction of rotation of the die table is represented by arrow A. A rotationally fixed feeding tube 224 opens onto the die table 200. The feeding tube opens onto a cone similar to that illustrated in FIG. 5. Also illustrated is a spiral deflector arm 226 which serves to move material radially outwards from the base of the cone to the inside of a feeder wall 230. A main scraper 223 removes surplus material from the die faces and returns it to the inside of the feeder wall 230 which forms a continuation of the main scraper disposed radially inwardly of the dies. The main scraper is in close contact with the die table until the upper punch has entered the die thereby ensuring the correct metered dose. Thereafter the feeder wall may be slightly spaced from the die table as some leakage past the feeder wall is immaterial once the upper punch has entered the die. Also illustrated is an arcuate deflector 232 which serves to move material radially outwards to the pitch line of the dies and is disposed in a position corresponding generally to that where filling would start in relation to the arcuate movement of the die table. In the illustrated embodiment the spiral deflector 226 terminates radially inwardly of the feeder wall and a pivoted sensing vane 234 is disposed between it and the feeder wall. Its angular position is responsive to the quantity of material disposed on the die plate. A micro switch or proportional sensor 236 monitors movement of the pivoted sensing vane and serves to adjust the quantity of material flowing onto the die table in response to demand. In one embodiment the feeding tube is moved axially with respect to the distribution cone so that the open end of the feeding tube moves between a closed position where it contacts the cone and an open position. Movement may be continuously variable or between open and closed positions.

In an alternative embodiment of FIG. 11, the spiral deflector 226 is positioned so as to form a continuation of the arcuate deflector 232 as shown in dotted outline.

Referring to FIGS. 12, 13 and 14 of the drawings, a rotary tabletting press comprises a stationary housing 301 accommodating a drive shaft 302 journalled for rotation in the housing in a conventional manner (not shown) and having an axis of rotation R and having mounted thereon in driving connection therewith a lower part 303 of a rotatable turret. The lower part incorporates a plurality of circumferentially spaced bores 305 for respective lower punches of opposed pairs of upper and lower punches. The lower part includes an annular die plate 307 accommodating a plurality of circumferentially spaced die cavities 309 set on a common pitch circle diameter coaxial with the axis of a shaft 302 in a conventional manner. The turret further comprises an upper part 313 accommodating upper punch housings 315 with a plurality of circumferentially spaced bores 316 for the upper punches, and a peripheral wall element 317 which contacts the die plate 307. A chamber 319 is defined radially inwardly of the wall 317 and between the upper and lower parts 303 and 313 of the turret.

The upper turret part 313 is journalled for rotation on a stationary spindle 321 which incorporates two coaxial tablet material feed passage 323, 324 feeding material to respective local stationary tabletting material feeders 326, 328 disposed diametrically opposite one another in the illustration. Each feeder comprises a compartment open to the underside and placed to make sliding engagement with the upper surface of the die plate and extending over a prescribed distance. Tabletting material is fed to the respective feeders via a respective radial passage 327 from a respective infeed passage 323, 324. Respective pairs of upper and lower punches 331, 333 controlled by respective upper and lower cams (not illustrated) are slidably guided in the respective bores 316, 305 of the upper and lower punch housings to be entrant into the die cavity 309 according to the prescribed working cycle. The punches are shown in FIG. 14 by way of example. Referring now to FIG. 13 in which rotation of the turret is denoted by arrow A and in which only a few of the die cavities are illustrated, the respective local feeders 326, 328 are positioned so that the die cavities intercept them so that tabletting material from the feeder enters successive die cavities 309 as they pass during rotation of the turret. The circumferential extent of the feeders is sufficient to allow entry of the tabletting material into the die. The upper punch enters the die cavity when it is clear of the feeder. The compression cycle largely follows conventional practice, for example using stationary cams and compression rolls. However, it will be noted that tablet ejection is by downward movement of the upper punch to eject the completed tablet from the lower opening of the die cavity into a take-off chute (not illustrated). A take-off blade may be provided to wipe the lower surface of the die plate 307.

What I claim is:

1. A rotary tabletting press for the production of tablets from tabletting material, comprising a turret driven to rotate about its own axis with respect to a stationary housing and having axially separable upper and lower housing parts, the turret carrying rotatably with it, die plate accommodating a plurality of die cavities set on a common pitch circle diameter coaxial with the axis of the turret, which die cavities each comprise a through bore having an upper opening and a lower opening;

chamber enclosed within the rotatable turret between the upper and lower housing parts of the turret and defined at least in part by an upper surface of the die plate and by an outer peripheral wall element of the turret which is rotatable therewith, the chamber being disposed above the die plate, and and wherein the respective upper openings of the die cavities open into said chamber, and by which openings tabletting material is admitted to the die cavities; and respective pair of upper and lower punches to work in each die cavity, which punches are guided in respective punch housings carried with the turret above and below the respective die cavities and coaxially therewith, said chamber being interposed between the upper punch housings and the die plate and with the upper punches being axially movable through said chamber to enter the respective die cavity;

the press further comprising means to control axial movement of the respective opposed punches during a working cycle to form tablets in successive die cavities, tabletting material for filling the die cavities being supplied onto the upper surface of the die plate by way of at least one centrally positioned feed tube, and means to control the dosing of tabletting material admitted to the die cavities, said means to control the dosing comprising a non-rotatable element disposed within the chamber adjacent said upper surface of the die plate and intersecting a path of the die cavities.

2. A rotary tabletting press as claimed in claim 1, wherein a delivery end of said centrally positioned feed tube opens onto a conical distribution surface.

3. A rotary tabletting press according to claim 2, in which the relative spacing between the delivery end of the feed tube and conical distribution surface is adjustable.

4. A rotary tabletting press as claimed in claim 1, in which the means to control dosing of the die cavities comprises at least one stationary local tabletting material feeder disposed in said chamber and opening onto a discrete area of the upper surface of the die plate to feed tabletting material into successive die cavities as they pass under the feeder.

5. A rotary tabletting press according to claim 1, wherein the means to control dosing of the die cavities comprises a fixed scraper blade.

6. A rotary tabletting press according to claim 1, further comprising tablet ejection means for ejecting finished tablets through the lower opening of the die cavity.

7. A rotary tabletting press according to claim 1, further comprising a plurality of dies, wherein each die comprises a generally cylindrical body having relieved portions at opposite ends and a respective one of said plurality of die cavities.

8. A rotary tabletting press according to claim 1, wherein each through bore is uninterrupted and opens upwardly into said chamber.

9. A rotary tabletting press according to claim 1, further including a stationary vane disposed in the enclosed chamber and extending outwardly from the feed tube to transport tabletting material radially outwardly over the die plate into the path of the cavities.

10. A rotary tabletting press for the production of tablets from tabletting material, comprising:

a turret driven to rotate about its own axis with respect to a stationary housing and having axially separable upper and lower housing parts, the turret carrying rotatably with it, a die plate accommodating a plurality of die cavities set on a common pitch circle diameter coaxial with the axis of the turret, which die cavities each comprise a through bore having an upper opening and a lower opening;

a chamber enclosed within the turret between the upper and lower housing parts and defined at least in part by an upper surface of the die plate and by an outer peripheral wall element of the turret which is rotatable therewith, the chamber being disposed above the die plate, and wherein the respective upper openings of the die cavities open into said chamber, and by which openings tabletting material is admitted to the die cavities, and further wherein the chamber is supplied with tabletting material by way of a centrally positioned feed tube having a delivery end opening onto a conical distribution surface spaced from said delivery end of said feed tube; and a respective pair of upper and lower punches to work in each die cavity, which punches are guided in respective punch housings carried with the turret above and below the respective die cavities and coaxially therewith, said chamber being interposed between the upper punch housings and the die plate and with the upper punches being axially movable through said chamber to enter the respective die cavity;

the press further comprising means to control axial movement of the respective opposed punches during a working cycle to form tablets in successive die cavities, and means to control the dosing of tabletting material admitted to the die cavities.

11. A rotary tabletting press according to claim 10, wherein the delivery end of the centrally positioned feed tube is adjustable relative to the conical distribution surface.

12. A rotary tabletting press for the production of tablets from tabletting material, comprising a turret driven to rotate about its own axis with respect to a stationary housing and carrying rotatably with it:

die plate accommodating a plurality of die cavities set on a common pitch circle diameter coaxial with the axis of the turret, which die cavities each comprise a through bore having an upper opening and a lower opening;

a plurality of dies providing a respective said die cavity and wherein each die comprises a generally cylindrical body having relieved portions at opposite ends;

at least one die clamping element which is cooperable with a plurality of said dies and wherein location of the die clamping element serves to locate said plurality of dies simultaneously;

an enclosed chamber disposed above the die plate and wherein the respective upper openings of the die cavities open into said chamber and by which openings tabletting material is admitted to the die cavities; and a respective pair of upper and lower punches to work in each die cavity, which punches are guided in respective punch housings carried with the turret above and below the respective die cavities and coaxially therewith, said chamber being interposed between the upper punch housings and the die plate and with the upper punches being axially movable through said chamber to enter the respective die cavity; the press further comprising means to control axial movement of the respective opposed punches during a working cycle to form tablets in successive die cavities, and means to control the quantity of tabletting material admitted to the die cavities.

13. A rotary tabletting press as claimed in claim 12, wherein the turret comprises upper and lower housing parts in which are guided the upper and lower punches, respectively, and wherein location of the at least one die clamping element is brought about on bringing together of the upper and lower housing parts.

14. A rotary tabletting press according to claim 12, in which for each die a resilient compensation element is disposed between the die and at least one of the die clamping element and the die plate.

15. A rotary tabletting press according to claim 12, in which the die clamping element comprises an annular member having a plurality of bores to receive snugly a relieved end portion of a respective die.

\* \* \* \* \*